May 20, 1924.
C. J. MANNING
PRESSURE GAUGE
Filed March 7, 1923
1,494,496
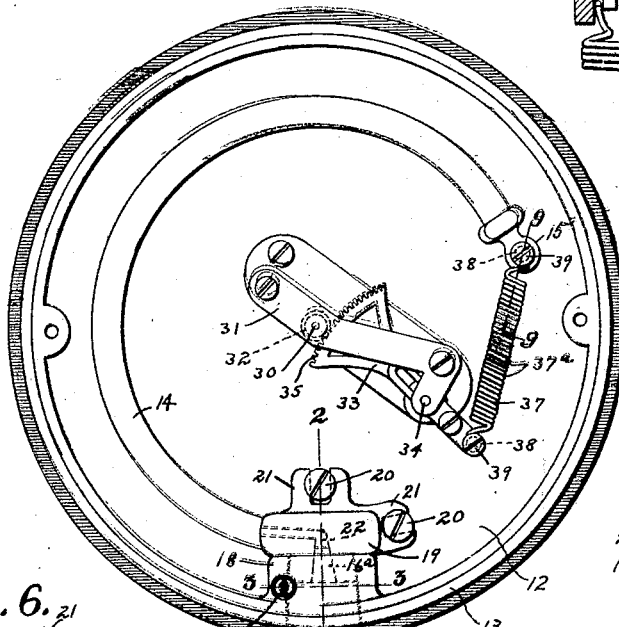
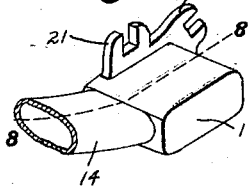
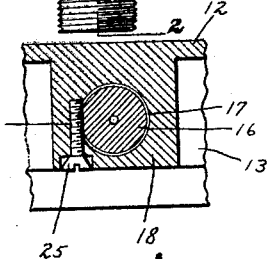
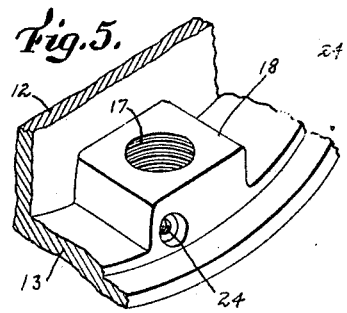
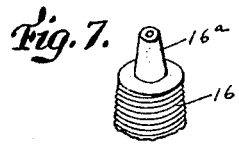
Inventor
Coleman J. Manning
by Wright Brown Quinby May
Att'ys.

Patented May 20, 1924.

1,494,496

UNITED STATES PATENT OFFICE.

COLEMAN J. MANNING, OF MEDFORD, MASSACHUSETTS.

PRESSURE GAUGE.

Application filed March 7, 1923. Serial No. 623,374.

*To all whom it may concern:*

Be it known that I, COLEMAN J. MANNING, a citizen of the United States, residing at Medford, in the county of Middlesex and State of Massachusetts, have invented new and useful Improvements in Pressure Gauges, of which the following is a specification.

This invention relates to a pressure gauge of the Bourdon spring type, the gauge including a circular case, a screw-threaded tubular nipple fixed to and projecting from the case, and a Bourdon spring fixed at one end to the case, the bore of the spring communicating with the bore of the nipple.

Heretofore the nipple and the inner end of the Bourdon spring have been inseparably united prior to their engagement with the case, the nipple being inserted in an orifice formed for its reception in the circular wall of the case, and provided with oppositely projecting ears or flanges, bearing on the interior of the case wall, and attached to the latter by screws, the nipple projecting from the exterior of the case wall in position to be screwed into the gauge-supporting socket.

In installing the gauge, the workman ordinarily grasps the case with his hands and turns it while screwing the nipple into the gauge-supporting socket. This operation involves much strain on the attaching screws, and often results in loosening the screws and rendering the nipple and spring correspondingly loose, so that the gauge reading becomes inaccurate.

Heretofore the free end of the Bourdon spring, to which is attached a perforated ear or tip, has been connected with the perforated arm of a lever, forming a part of the mechanism for imparting movement from the Bourdon spring to the pointer-carrying arbor, by a stiff or inelastic connecting bar or rod, perforated at its opposite ends and connected with the spring ear and with the lever arm by screws or studs closely fitting and adapted to turn in the perforations in the spring ear and lever arm.

A gauge of this type, installed on such equipment as a pump, a compressor, a hoisting engine, a steam roller, etc., is subjected to such severe vibration that frequently, there is a loosening, from this cause, of both the screws connecting the nipple ears or flanges to the case, and of the perforations in the spring ear and in the lever arm, so that both the nipple-securing screws, and the connecting bar screws or studs, are so loosened as to seriously impair the accuracy of the gauge.

One object of the invention is to prevent the loosening of the connection between the fixed end of the Bourdon spring and the case, by the operation of screwing the nipple into the gauge-supporting socket, and by the vibration to which the gauge is subjected.

Another object is to prevent the loosening of the connections between the free end of the Bourdon spring and the above-mentioned lever arm, by the vibration to which the gauge is subjected.

I attain these and other related objects by the improvements hereinafter described and claimed.

Of the accompanying drawings forming a part of this specification,—

Figure 1 is a front elevation of a pressure-gauge embodying the invention, the dial and the pointer being removed.

Figure 2 is a section on line 2—2 of Figure 1.

Figure 3 is a section on line 3—3 of Figure 1.

Figure 4 is a view similar to Figure 2, showing a modification.

Figure 5 is a fragmentary perspective view, showing a portion of the case.

Figure 6 is a fragmentary perspective view, showing a portion of the Bourdon spring and its holder.

Figure 7 is a fragmentary perspective view, showing a portion of the nipple, formed as shown by Figures 1 and 2.

Figure 8 is a section on line 8—8 of Figure 6.

Figure 9 is a section on line 9—9 of Figure 1.

Figure 10 is a view similar to Figure 9, showing a modification.

The same reference characters indicate the same parts in all the figures.

Referring first to Figures 1 and 2, 12 represents the back, and 13 the circular wall of a pressure-gauge case of ordinary form. 14 represents an ordinary Bourdon spring, having means at its free end, such as a perforated ear 15, for engagement with the usual mechanism connecting the free end with the usual pointer.

16 represents the nipple which is fixed to and projects from the exterior of the case, and has a threaded outer end, adapted to be screwed into a fixed internally threaded gauge-supporting socket (not shown), the nipple being threaded at its inner end, and fixed to the case by being screwed into a tapped socket 17 therein, as shown by Figure 3.

The outlet of the nipple is preferably formed by a frusto-conical extension 16ᵃ the perimeter of which forms a frusto-conical valve face which projects above the enlargement 18, as shown by Figure 2.

The socket 17 is formed in an internal enlargement 18, cast with the case, and extends through said enlargement, as shown by Figure 5.

19 represents a rigid holder, rigidly united preferably by soldering or brazing to the inner end of the spring 14, and fixed rigidly to the case, preferably by screws 20, engaging slotted ears 21, formed on the holder. The holder is provided with a fluid inlet 22, preferably of frusto-conical form, fitting the extension 16ᵃ.

When the nipple is screwed into the socket 17, the valve face of the extension 16ᵃ closely fits the inlet 22, and forms a fluid tight joint therewith. Said joint is formed before the nipple is engaged with the usual fixed socket which supports the gauge. After forming said joint, I lock the nipple, to prevent its rotation in the socket 17, locking means being provided for this purpose, preferably comprising a tapped key socket 24, formed in the enlargement 18, and tangential to the nipple socket 17, and a key 25, formed as a hardened steel screw engaged with the socket 24, and engaging portions of the nipple thread, as indicated by Figure 3. The insertion of said key prevents the possibility of any displacement of the nipple and of the spring holder 19, by the operation of screwing the outer end of the nipple into the usual gauge-supporting socket, the nipple being, in effect, an integral part of the case after the insertion of the key.

The frusto-conical extension 16ᵃ and the frusto-conical inlet 22, permit the formation of an effective joint, by the operation of screwing the nipple into the socket 17. I am not limited, however, to this form of joint, and may provide the nipple with a flat valve face 27, (Figure 4) surrounding the nipple outlet, the holder 19 being provided with a flat seat 28, surrounding the inlet 22. A compressible washer 29, of lead or other suitable material, may be interposed between the face 27 and the seat 28.

30 represents the usual arbor journaled in bearings in a frame 31, attached to the back of the case, said arbor carrying the usual pointer (not shown).

Motion is transmitted from the free end of the Bourdon spring 14 to the arbor 30, by mechanism which includes, as heretofore, a pinion 32, on the arbor, and a two-armed lever 33, pivoted at 34, and having on one arm a gear sector 35, meshing with the pinion.

Heretofore the other arm of the lever 33 has been connected with the free end of the spring 14, by a rigid connecting-rod, having orifices in its ends, and studs or screws attached to the lever and to the ear 15, of the spring, and occupying said orifices.

The vibration to which the mechanism is subjected when the gauge is in use, causes wear of said orifices and studs, so that the orifices become enlarged, and the studs reduced, until the connection is inoperative. To remedy this defect I connect the lever 33 with the free end of the spring by a member 37, which is resilient, and adapted to absorb vibrations and prevent wear of the connections between its opposite ends and the lever and the spring.

The member 37 may be a helical wire spring, and the connections may be formed by eyes 38, formed on the ends of the spring, and studs or screws 39 passing through said eyes and engaged with the lever and the ear 15 of the spring.

I find that the member 37 accurately transmits motion from the spring 14 to the lever 33, and that the connections between said member and the lever and spring are not worn by the vibrations. Some of the convolutions at the central portion of the member 37 may be slightly spread apart, as indicated at 37ᵃ the other convolutions being closely abutted together.

The ends of the member 37 may be otherwise connected with the spring ear or tip 15 and the lever 33. For example, when the member is a helical wire spring, its ends may be bent to form terminals, adapted to enter small orifices in the said ear and lever. One of said terminals 37ᵇ is shown by Figure 10, engaged with the ear 15. The other terminal may be similarly engaged with the lever 33.

The connecting member may be otherwise constructed to function as described. For example, it may be of flat-sided watch-spring wire, adapted to be flexed lengthwise.

It will be seen that the means connecting the inner end of the Bourdon spring with the case, and the means connecting the free end of the spring with the lever 33, cooperate in preventing impairment of the accuracy of the gauge by vibrations to which it is subjected.

I claim:

1. A pressure gauge comprising a case provided with a tapped nipple socket, having an open inner end within the case; a rigid holder detachably secured to the case and having an inlet registering with the inner end of the socket, and a seat surrounding said inlet; a Bourdon spring fixed to the holder and communicating with said inlet; a screw-threaded nipple engaged with said socket, and having a valve face surrounding its outlet end, and conforming to said seat, the arrangement being such that a fluid-tight joint is formed by said valve face and seat by the operation of screwing the nipple into the socket; and locking means operable after the formation of said joint to prevent rotation of the nipple in the socket.

2. A pressure gauge substantially as specified by claim 1, said seat and valve face being of frusto-conical form, the valve face entering the seat.

In testimony whereof I have affixed my signature.

COLEMAN J. MANNING.